United States Patent [19]
McCormick et al.

[11] Patent Number: 5,366,826
[45] Date of Patent: Nov. 22, 1994

[54] BATTERY PACK RETENTION SYSTEM AND APPARATUS THEREFOR

[75] Inventors: Timothy P. McCormick; Brian J. Hassemer, both of Gurnee, Ill.

[73] Assignee: Motorola, Inc., Schaumburg, Ill.

[21] Appl. No.: 123,653

[22] Filed: Sep. 20, 1993

[51] Int. Cl.$^5$ .............................................. H01M 2/10
[52] U.S. Cl. .......................................... 429/96; 429/99; 429/100
[58] Field of Search ........................... 429/96, 99, 100

[56] References Cited

U.S. PATENT DOCUMENTS

| | | | |
|---|---|---|---|
| 4,880,713 | 11/1989 | Levine | 429/96 |
| 4,904,549 | 2/1990 | Goodwin et al. | 429/123 |
| 5,104,754 | 4/1992 | Dorinski et al. | 429/99 |
| 5,290,639 | 3/1994 | Mallory | 429/96 |
| 5,300,372 | 4/1994 | Aksoy et al. | 429/99 |
| 5,308,716 | 5/1994 | Shababy et al. | 429/100 |

FOREIGN PATENT DOCUMENTS 2551663  5/1977  Germany ................ 429/99

*Primary Examiner*—Wayne Langel
*Attorney, Agent, or Firm*—Kirk W. Dailey

[57] ABSTRACT

The system includes a battery charger (300) and a battery pack (100). Upon insertion of the battery pack (100) into a retention area (303) of the battery charger (300), a battery pack channel (101) and a corresponding battery charger rail (305) align the battery pack electrical contacts (201) with the electrical contacts (309) of the battery charger. In order to ensure that a reliable electrical connection is made between the two sets of contacts (201, 309), a compliance rib (501) is disposed within the channel (101) of the battery pack (100). The compliance rib (501) creates an interference between the rail (305) and the channel (101), consequently, creating a force against the rail. The interference is calculated to create a sufficient force in combination with the force created by the weight of the battery pack (100) such that the force of the battery pack meets or exceeds the force created by the set of electrical contacts in the battery charger.

8 Claims, 6 Drawing Sheets

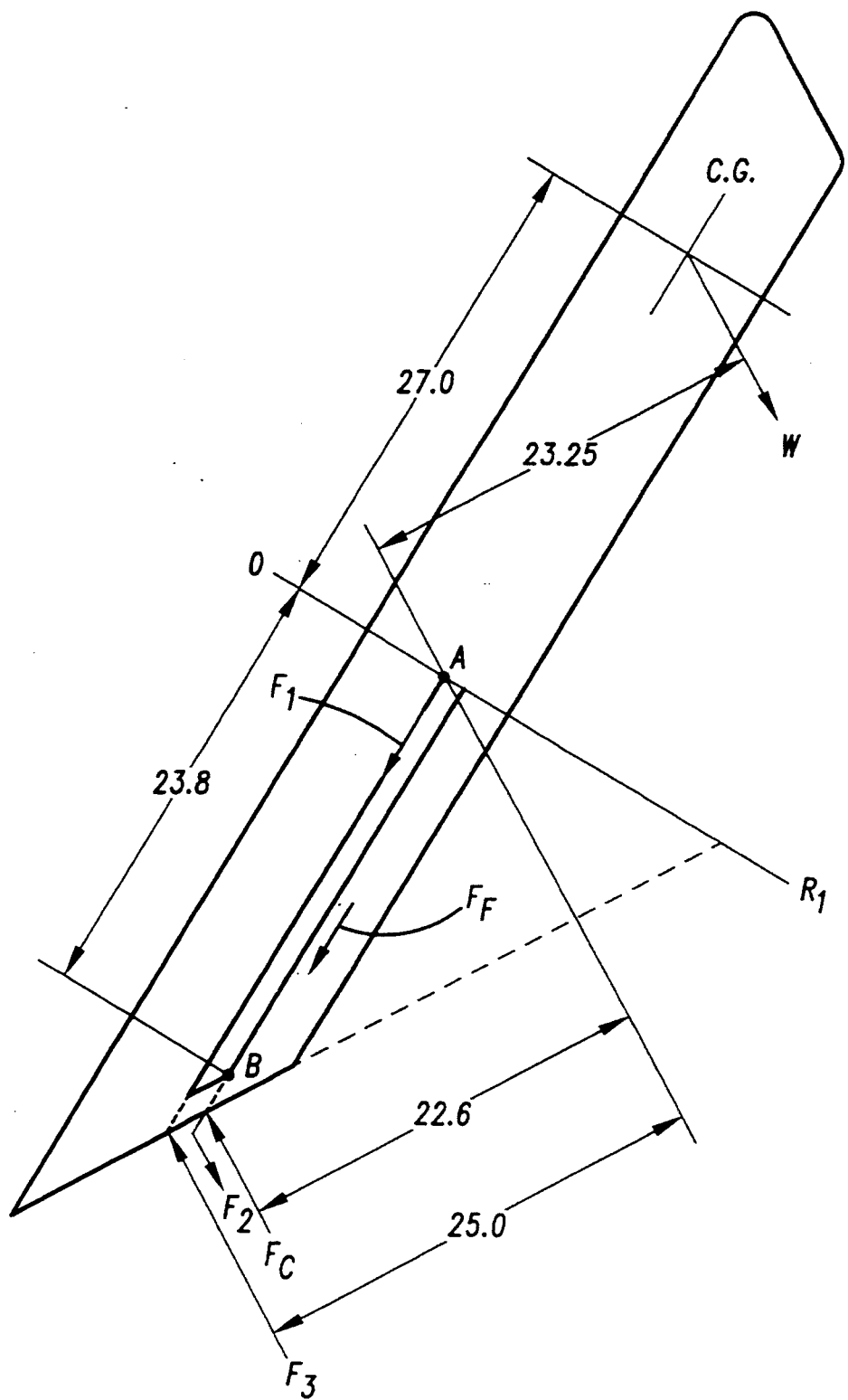
*F I G . 1 2*

BATTERY PACK RETENTION SYSTEM AND APPARATUS THEREFOR

FIELD OF THE INVENTION

Generally, this invention relates to battery packs and more specifically to an apparatus for retaining battery packs in a desired position to maintain electrical contact between the battery cells contained within the battery pack and an electrical apparatus, such as a battery charger.

BACKGROUND OF THE INVENTION

Generally, battery packs are used to retain one or more rechargeable battery cells for use with portable electronic devices. Since most battery packs contain rechargeable cells, the battery packs are also used with a battery charger. Battery packs contain at least one set of electrical contacts to provide electrical connection to the battery cells contained therein.

Battery chargers are often built with battery retention areas. Typically, the battery retention area has a set of electrical contacts for interfacing to the battery pack and charging the battery cells contained therein. The battery charger is designed such that a battery pack may be dropped into the battery retention area. Upon dropping the battery pack, the battery retention area and the battery pack will align electrical contacts of the battery pack with the electrical contacts of the battery charger.

One such battery retention system previously developed includes the following elements. First, a battery pack housing is developed which has two channels running lengthwise along the battery pack housing on opposite sides of the battery pack. Second, the battery charger contains a battery retention area having a width equal to that of the battery pack housing. Third, the battery retention area contains two rails disposed on opposite sides of the battery retention area. The two rails are disposed in such a manner that when the battery pack is dropped into the battery retention area, the two rails are aligned with the channels of the battery pack. Fourth, the battery retention area also provides a set of electrical contacts coupled to the charger within the housing. Upon insertion of the battery pack into the retention area, the channels and corresponding rails align a set of electrical contacts on the battery pack with the electrical contacts of the battery charger. The electrical contacts of the battery charger protrude through openings in the battery retention area of the battery charger and exert a predetermined force upon the battery pack when the battery pack is fully inserted into the battery retention area. Typically, the weight of the battery pack provided sufficient force to overcome the force of the battery chargers electrical contacts, thus, providing a reliable electrical connection between the battery cells contained within the battery pack and the battery charging device.

Today, the market demands and technology has provided us with a lighter, more efficient battery pack and corresponding battery cells. As a result of the lighter battery packs, the force created by the weight of the battery pack is no longer sufficient to overcome the force generated by the electrical contacts of the battery charger. Thus, it would be advantageous to have a battery retention system which provides a reliable electrical connection between the battery charger and the battery cells contained within the battery pack.

BRIEF DESCRIPTION OF THE DRAWINGS

FIG. 12 is a free body diagram illustrating all the forces, moments of forces and angles used in calculations in accordance with the present invention.

DESCRIPTION OF A PREFERRED EMBODIMENT

Generally, the present invention encompasses a battery retention system and apparatus therefor. The system includes a battery charger and a battery pack. The battery charger has a battery reception area, including at least one rail and a set of electrical contacts. The battery pack contains at least one battery cell, a channel, a compliance rib and a set of electrical contacts. The electrical contacts are connected to the battery cell and exposed on the outside of the battery pack.

Upon insertion of the battery pack into the retention area, the channel and the corresponding rail align the battery pack electrical contacts with the electrical contacts of the battery charger. The electrical contacts of the battery charger protrude through openings in the battery retention area of the battery charger and exert a predetermined force upon the battery pack when the battery pack is fully inserted into the battery retention area. In order to ensure that a reliable electrical connection is made between the two sets of contacts, a compliance rib is disposed within the channel of the battery pack. The compliance rib creates an interference between the rail and the channel, consequently, creating a force against the rail. The interference is calculated to create a sufficient force in combination with the force created by the weight of the battery pack such that the force of the battery pack meets or exceeds the force created by the set of electrical contacts in the battery charger.

Figure 1:
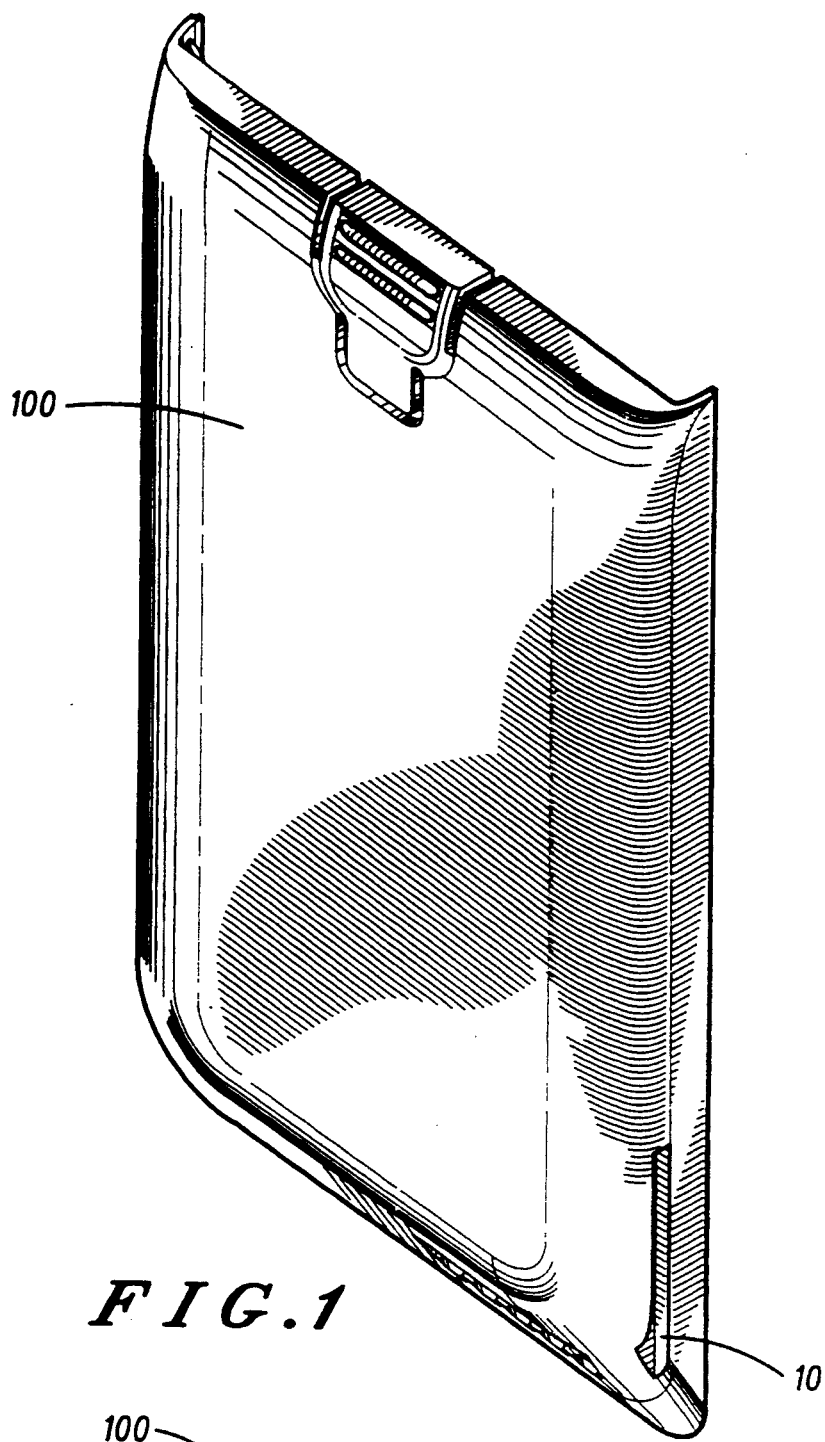
FIG. 1 is an illustration of a perspective view of a battery pack in accordance with the present invention.

FIG. 1 is an illustration of a battery pack 100 for use on a portable radiotelephone, or any other portable electronic device which is designed to carry such a battery pack. The battery pack 100 of FIG. 1 shows a channel 101 which would mate with the rails of a battery charger. The battery pack 100 also contains a second channel opposite channel 101 which cannot be clearly seen in FIG. 1. Channel 101 runs lengthwise along a first side of the battery pack 100. The second channel also runs lengthwise along the side parallel to the first side.

Figure 2:
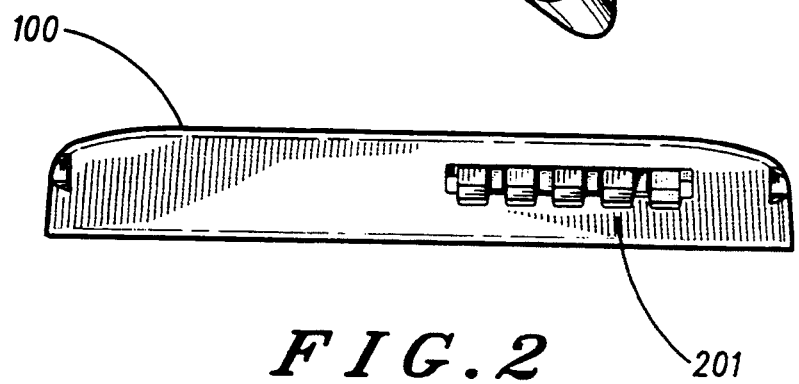
FIG. 2 is an illustration of a front elevational view of the battery pack illustrated in FIG. 1.

FIG. 2 is a front elevational view of the battery pack 100 illustrated in FIG. 1. The battery pack 100 contains a first set of electrical contacts 201. This set of electrical contacts 201 are used to provide an external connection to the battery cells contained within the battery pack housing 100. A properly designed battery charger provides a battery pack retention area with a set of contacts aligned with the electrical contacts 201 of the battery pack 100. This alignment provides an electrical connection for recharging the battery cells contained within the battery pack 100.

Figure 3:
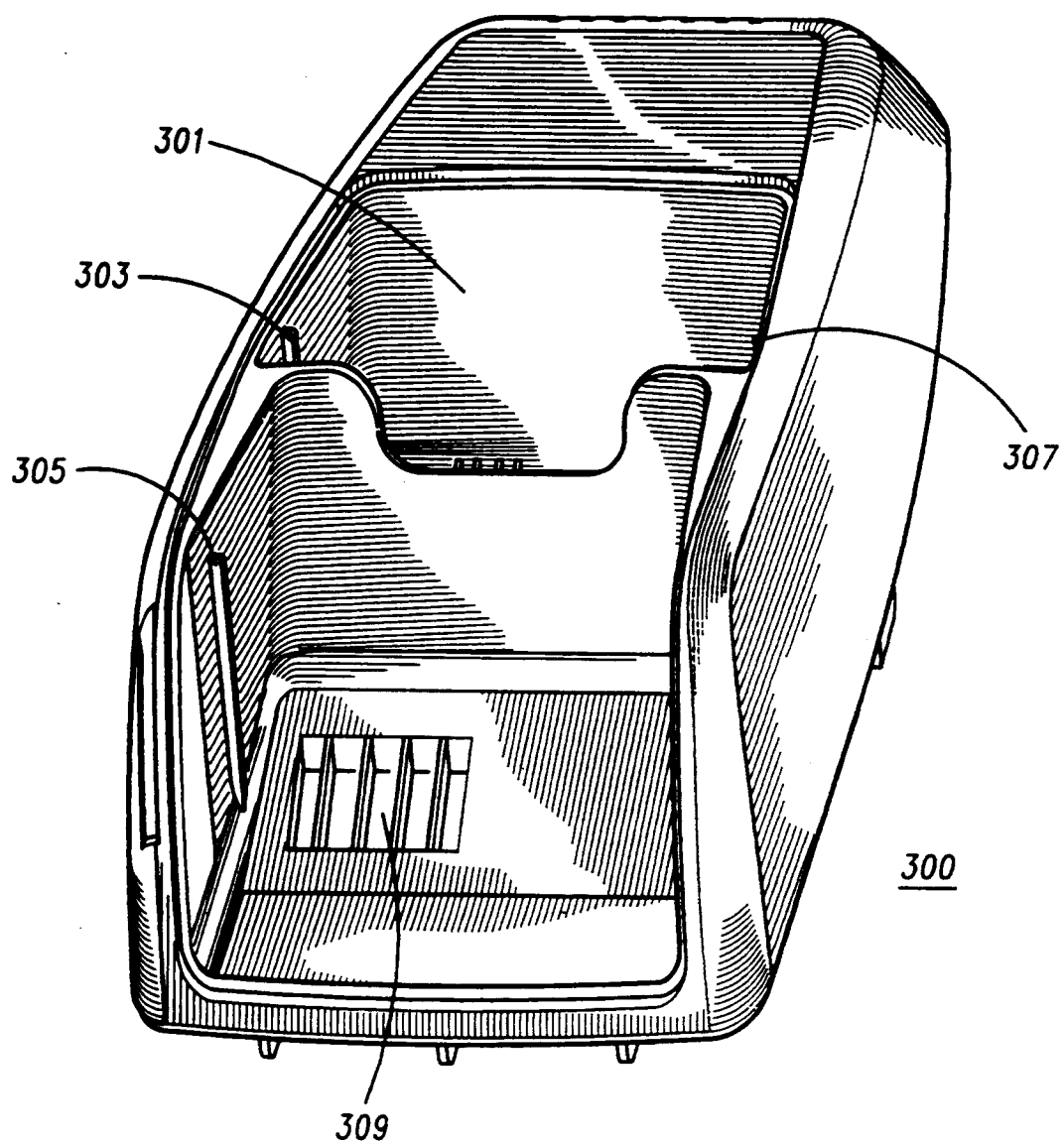
FIG. 3 is an illustration of a battery charger in accordance with the present invention.

FIG. 3 is an illustration of a perspective view of a battery charger 300 in accordance with the present invention. In the preferred embodiment, the battery charger is kit number SPN4216A available from Motorola, Inc.. Battery charger 300 includes two battery pack retention areas 301, 303. The battery retention area 303 has a first rail 305 and a second rail 307 disposed on the internal surfaces thereof. Additionally, the battery retention area 303 includes a set of electrical contacts 309 for providing electrical connections to a battery pack inserted in the battery retention area 303. The set of electrical contacts 309 protrude through the openings in the battery charger housing and generate a force against the battery pack 100 when the battery pack is fully inserted. In the preferred embodiment, there are five electrical contacts in this set of contacts. Each electrical contact provides 50 grams of force, resulting in a total force for the set of electrical contacts of 250 grams.

Figure 4:
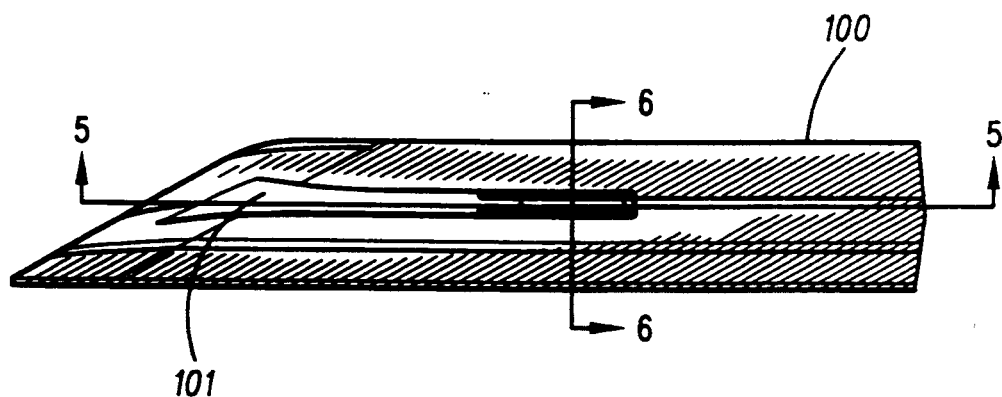
FIG. 4 is an illustration of a side elevational view of the battery pack illustrated in FIG. 1.
Figure 5:
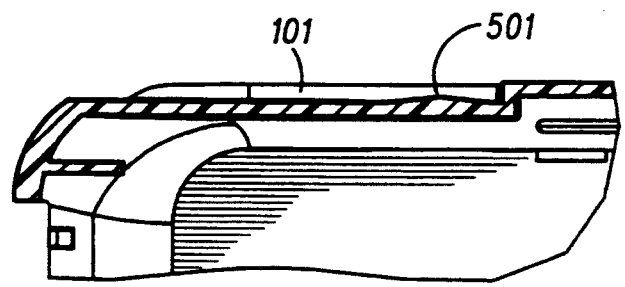
FIG. 5 is an illustration of a cross-sectional view Z—Z of the battery pack illustrated in FIG. 4.

FIG. 4 is an illustration of a side elevational view of battery pack 100 showing cross-sectional arrows Z—Z and cross-sectional arrows E—E. FIG. 5 is an illustration of section Z—Z. FIG. 5 illustrates the channel 101 in the compliance rib 501 disposed therein. The compliance rib 501 is made of a material which allows deflection upon insertion of the battery pack 100 into the battery charger 300. In the preferred embodiment, the compliance rib 501 is made of a material having a model number SP1210 available from GE Plastics, Inc. Other appropriate materials may be selected by one of average skill in the art, choosing the characteristics of the material using the calculations illustrated below.

Figure 6:
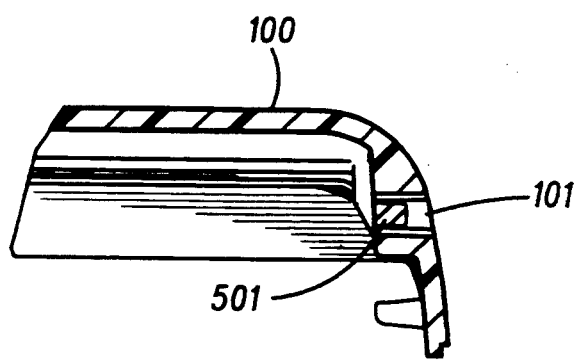
FIG. 6 is an illustration of a cross-sectional view E—E of the battery pack illustrated in FIG. 4.
Figure 7:
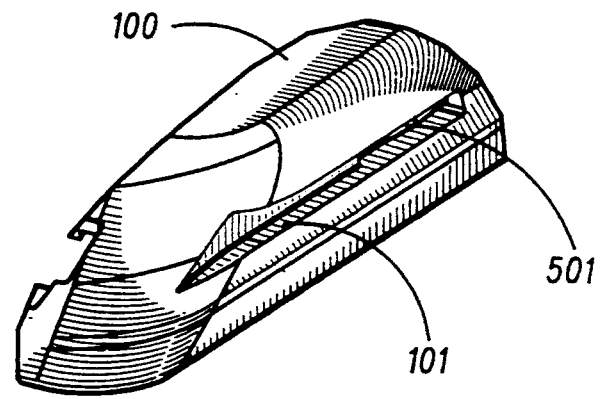
FIG. 7 is an illustration of a perspective view of a portion of the battery pack illustrated in FIG. 1.

FIG. 6 illustrates a cross-sectional view E—E of the battery pack 100. Specifically FIG. 6 illustrates channel 101 and the compliance rib 501. FIG. 7 is an illustration of a perspective view of the battery pack 100 illustrating the channel 101 and the compliance rib 501.

Figure 8:
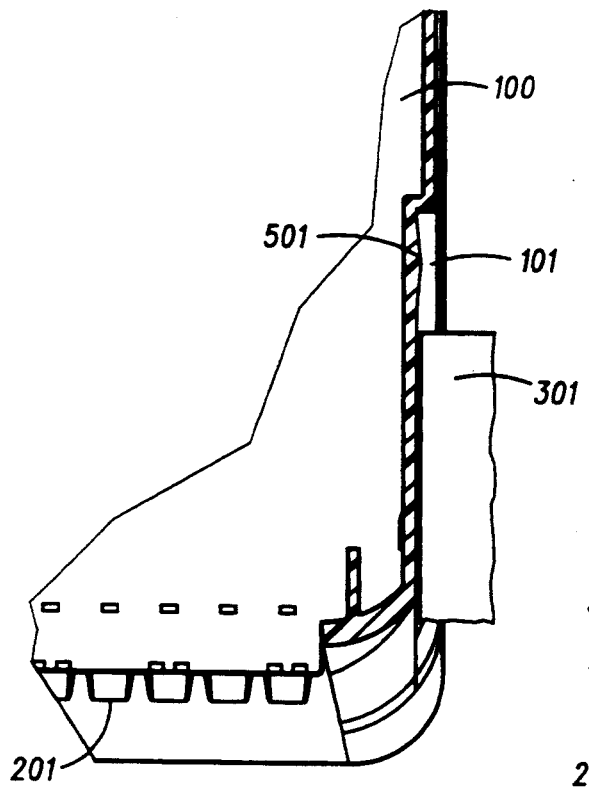
FIG. 8 and FIG. 9 are illustrations of the interaction of the battery pack of FIG. 1 and the battery charger of FIG. 3 in accordance with the present invention.
Figure 9:
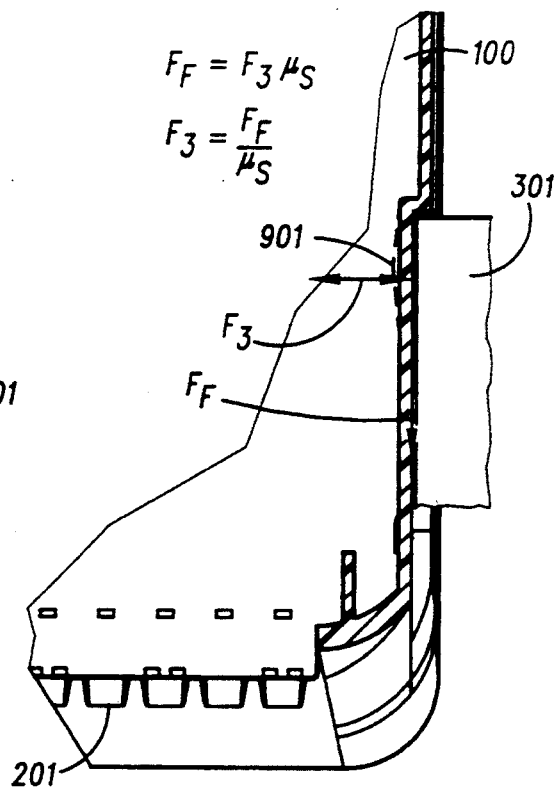

FIG. 8 and FIG. 9 illustrate the progressive steps of inserting the battery pack 100 into the battery charger 300. Specifically, FIG. 8 and FIG. 9 illustrate the interaction between the charger rail 305 of the battery charger 300 and the channel 101 and compliance rib 501 of the battery pack 100. The compliance rib 501 in FIG. 8 has a radius of curvature protruding into the channel 101. As the charger rail 305 approaches the compliance rib 501, the compliance rib 501 creates an interference between the charger rail and the channel 101. The compliance rib 501 is designed such that the interference causes the compliance rib 501 to deflect away from the charger rail 305, consequently, creating a force against the charger rail 305. The interference and amount of deflection are calculated to create a sufficient friction force, $F_f$, in combination with the force created by the weight of the battery pack 100 such that the force of the battery pack meets or exceeds the force created by the set of electrical contacts in the battery charger 300. The manner in which the amount of deflection and interference and the required forces are calculated is described below.

Figure 10:
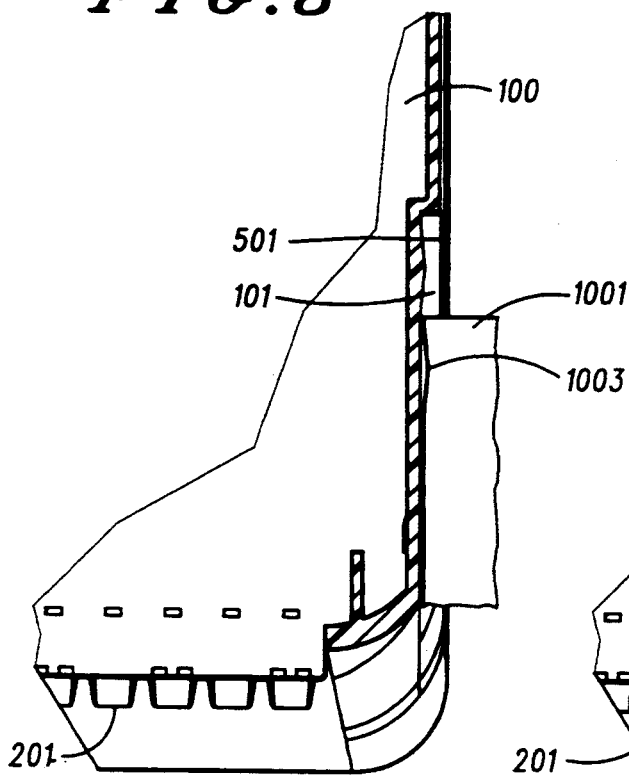
FIG. 10 and FIG. 11 are illustrations of the interaction of the battery pack of FIG. 1 and an alternative battery charger in accordance with the present invention.
Figure 11:
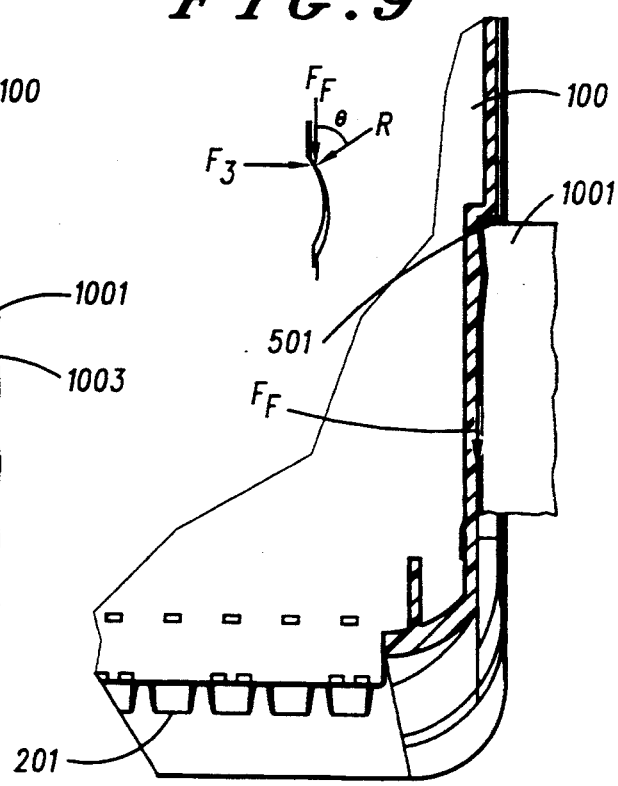

FIG. 10 and FIG. 11 illustrate an alternative embodiment to the embodiment illustrated in FIG. 8 and FIG. 9. Specifically, FIG. 10 and FIG. 11 illustrate the interaction between the charger rail 1001 and the channel 101 and compliance rib 501 of the battery pack 100. Here, the battery charger rail 1001 contains a detent 1003. Upon insertion of the battery pack 100 into the battery charger 300, the compliance rib 501 is deflected until the compliance rib 501 meets the charger rail detent 1003. Upon reaching the detent 1003, the compliance rib 501 creates an interference with the detent 1003 consequently, creating a force against the charger rail 1001. Additionally, the detent 1003 creates a force against the compliance rib 501. The interference and amount of deflection are calculated to create a sufficient force in combination with the force created by the weight of the battery pack 100 and the force created by the detent 1003 such that the force meets the force created by the set of electrical contacts in the battery charger 300. The manner in which the amount of deflection and interference and the required forces are calculated is described below.

FIG. 12 is a free body diagram illustrating all the forces, moments of forces and angles used in calculations in the preferred embodiment to calculate the appropriate deflection required by the compliance rib 501. Points A and B, as indicated in FIG. 10 are contact points between the battery channel 101 and the battery charger rail 305. Point A is the point around which all the moments of force are analyzed for purposes of the following equations. The following equations are used to calculate the necessary rail reaction forces required by the compliance rib for impending upward motion of the battery pack 100

$\Sigma F_y = 0 = F_c \cos(\theta - 30) - W - R_2 \cos 30 - F_2 \sin 30 - F_f \sin 30 - F_1 \sin 30 + R_1 \cos:$ $\Sigma F_x = 0 = R_2 \sin 30 - F_2 \cos 30 - F_f \cos 30 - F_1 \cos 30 - R_1 \sin 30 - F_c \sin(\theta - 30)$ $\Sigma M_A = 0 = R_2(23.8) - F_f(0.75) - F_2(1.5) - F_c(22.6) - W(27 \cos 30)$ $F_2 = \mu_s R_2, \quad F_1 = \mu_s R_1$ In the preferred embodiment, the following assumptions were made:

1. $\mu_s = 0.41$ the coefficient of static friction due to properties of the material used for the compliance rib.
2. $W = 78$ g/2, one half the weight of the battery pack.
3. $F_c = 5(50 \text{ g})/2 = 125$ g, the force created by the battery charger contacts which each compliance rib needs to overcome.
4. $\theta = 52°$, the angle from horizontal on which the battery retention area is aligned.
5. $R_3 = 0$, required for impending the upward motion of the battery pack.

Solving for the 3 unknowns in the 3 equations results in the following Matrix:

$$\begin{bmatrix} (\cos 30 - \mu_s \sin 30) & (-\cos 30 - \mu_s \sin 30) & -\sin 30 \\ (-\sin 30 - \mu_s \cos 30) & (-\sin 30 - \mu_s \cos 30) & -\cos 30 \\ 0 & (23.8 - 1.5\mu_s) & -0.75 \end{bmatrix} \begin{bmatrix} R_1 \\ R_2 \\ F_f \end{bmatrix} =$$

$$\begin{bmatrix} W - F_c \cos(\theta - 30) \\ F_c \sin(\theta - 30) \\ 22.6 + W27\cos 30 \end{bmatrix}$$

By properly calculating the force necessary for the compliance rib 501, one can design a battery retention system for numerous lighter weight batteries which will still provide a reliable electrical connection between the battery cells contained within the battery pack and the battery charger. In the preferred embodiment, the following forces were calculated assuming that there is no friction at point A and point B.

$$\begin{bmatrix} 0.616 & -0.616 & -0.788 \\ -0.788 & 0.788 & -0.616 \\ 0 & 23.18 & -0.75 \end{bmatrix} \begin{bmatrix} R_1 \\ R_2 \\ F_f \end{bmatrix} = \begin{bmatrix} -76.9 \\ 46.8 \\ 3473.3 \end{bmatrix}$$

Where
$R_1 = 66.7$ g
$R_2 = 150.9$ g
$F_f = 31.8$ g
$F_f = 31.8$ grams which is equal to 0.312 Newtons (N). This force is necessary for retaining the battery pack 100 in the battery charger 300.

In order to determine the amount of interference and deflection necessary we convert $F_f$ to $F_3$ for both embodiments described above. First, for the pure friction force illustrated in FIG. 8 and FIG. 9, $F_3$ is the force generated by the compliance rib 501 against the battery charger rail 305. $F_3 = F_f/us XX$. In the preferred embodiment, $F_3 = 0.312N/0.41 = 0.76N$. Second, for the alternative embodiment illustrated in FIG. 10 and FIG. 11, $F_3 = F_f \tan \theta$, where $\theta = 60°$ as illustrated in FIG. 11. Resulting in $F_3 = 0.312 \tan 60° = 0.54N$.

Figure 13:
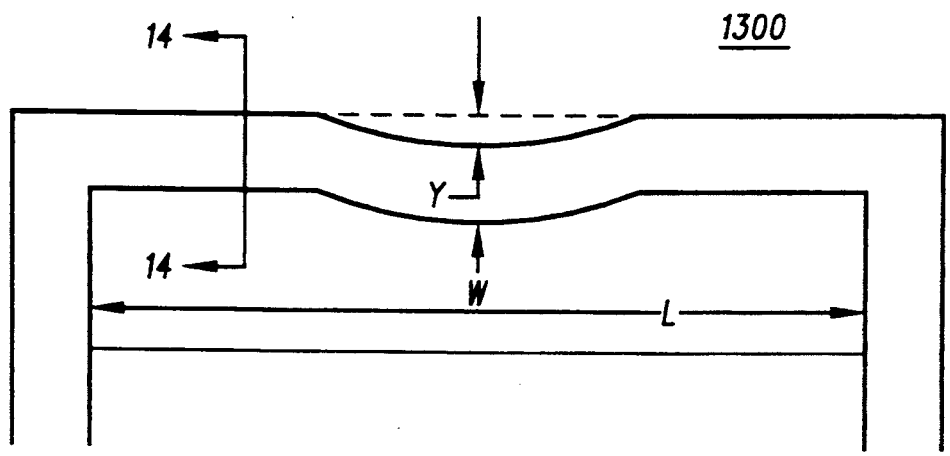
FIG. 13 is an illustration of a theoretical fixed end beam used for calculation in accordance with the preferred embodiment.
Figure 14:
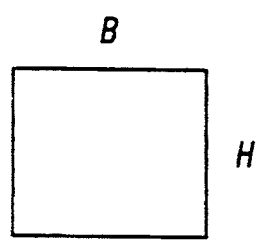
FIG. 14 is an illustration of a cross section B—B as indicated in FIG. 13.

FIG. 13 is an illustration of a theoretical fixed end beam 1300. The fixed end beam 1300 was used to calculate the base and height of the compliance rib 501 which is necessary to create the desired force $F_3$. FIG. 14 is an illustration of cross section B—B as indicated in FIG. 13. Using the equations for the deflection, y, the moment of force, I, and the maximum stress of the material, $\sigma_{max}$, one can solve for the unknown values b and h.

$$y = \frac{F_3 L^3}{192 EI}, \ I = \frac{bh^3}{12}, \text{ and } \sigma_{MAX} = \frac{3}{4} \frac{F_3 L}{bh^2}$$

In calculating the dimensions of the compliance ribs the following assumptions were made for the first embodiment:
1. y = the amount of desirable deflection = 0.5 mm
2. $s_{max}$ = maximum stress of material = 40N/mm$^2$
3. L = 13 mm
4. $F_3 = 0.76$N for the first embodiment
5. E = Young's modulus = 1900N/mm$^2$
resulting in the following equations for b and h:

$$b = \frac{F_3 L^3}{16 E h^3 y} = \frac{(0.76)(13)^3}{16(1900)(0.59)^3(0.5)} = 0.53 \text{ mm}$$

$$h = \frac{\sigma_{MAX} L^2}{12 E y} = \frac{40(13)^3}{12(1900)(0.5)} = 0.59 \text{ mm}$$

for the second embodiment, the force $F_3 = 0.54N$ all the other numbers stay the same resulting in b = 0.38 mm and h = 0.59.

What is claimed is:

1. A battery pack retention system comprising:
   an electronic apparatus having a first housing shaped to form a retention area for receiving a battery pack, the retention area having a first rail disposed on an internal surface thereof; and
   a battery pack having a weight and a battery pack housing having a shape to fit within the retention area, the battery pack housing having a first channel on a first outer surface such that the first channel and the first rail mate when the battery pack is inserted into the retention area, the first channel having a first compliance rib disposed therein generating a first force on the first rail.

2. A battery pack retention system in accordance with claim 1 wherein said retention area has a second rail disposed on therein and said battery pack housing has a second channel on a second outer surface of the battery pack housing, said second channel has a second compliance rib disposed therein generating a second force on the second rail when the battery pack is inserted into the retention area.

3. A battery pack retention system in accordance with claim 1 wherein said electronic apparatus is a battery charger.

4. A battery pack retention system in accordance with claim 1 wherein said electronic apparatus further comprises:
   openings in the first housing for a first set of electrical contacts;
   a first set of electrical contacts protruding through the openings and exerting a third force upon the battery pack when the battery pack housing is inserted into the retention area.

5. A battery pack retention system in accordance with claim 4 wherein said first force, said second force and a fourth force created by the weight of the battery pack at least equal the third force created by the first set of electrical contacts.

6. A battery pack comprising:
   a first battery cell;
   a first set of electrical connections having a first end and a second, the first end coupled to the first battery cell; and
   a battery pack housing for providing an electrical connection between the first battery cell and an electrical device, the electrical device having an electrical device housing and a second set of electrical contacts exerting a third force on the battery pack, the second end of the first set of electrical contacts disposed on a first side of the battery pack housing, the battery pack housing comprising:
   a first channel for mating to a first rail of the electrical device housing, the first channel positioned lengthwise along a first side of the battery pack housing, and
   a first compliance rib disposed within the first channel for providing a first calculated interference between the first channel and the first rail, the calculated interference generating a first force for maintaining electrical contact between the first battery cell and the electrical device via the first set of electrical connections.

7. A battery pack in accordance with claim 6 wherein the battery pack housing further comprises:

a second channel for mating to a second rail of the electrical device housing, the second channel positioned lengthwise along a second side of the battery pack housing; and a second compliance rib disposed within the second channel for providing a second calculated interference between the second channel and the second rail, the calculated interference generating a second force.

8. A battery pack in accordance with claim 7 wherein wherein said first force, said second force and a fourth force created by the weight of the battery pack is at least equal the third force created by the second set of electrical contacts.

* * * * *